United States Patent
Chung et al.

(10) Patent No.: US 6,265,529 B1
(45) Date of Patent: Jul. 24, 2001

(54) ANTISTATIC MONOMER CAST NYLON

(75) Inventors: Dae-won Chung, Suwon; Chang-Hoon Kim, Incheon, both of (KR)

(73) Assignee: Polypenco Korea Company Limited, Seoul (KR)

( * ) Notice: Subject to any disclaimer, the term of this patent is extended or adjusted under 35 U.S.C. 154(b) by 0 days.

(21) Appl. No.: 09/438,852

(22) Filed: Nov. 12, 1999

(30) Foreign Application Priority Data

May 27, 1999 (KR) .............................. 1999-19256

(51) Int. Cl.$^7$ .............................. C08G 69/08; C08K 3/04; C08K 7/16
(52) U.S. Cl. .............................. 528/310; 528/312; 528/322; 528/323; 528/326; 528/422; 524/495; 524/496; 524/606; 524/847; 523/223
(58) Field of Search .............................. 528/310, 312, 528/322, 323, 326, 422; 524/626, 496, 495, 847; 523/223

(56) References Cited

U.S. PATENT DOCUMENTS

| | | | |
|---|---|---|---|
| 4,831,098 | * 5/1989 | Watanabe et al. .............................. | 528/45 |
| 5,084,504 | * 1/1992 | Sano et al. .............................. | 524/496 |
| 5,179,155 | 1/1993 | Sano et al. .............................. | 524/496 |
| 5,744,573 | * 4/1998 | Brubaker .............................. | 528/310 |

OTHER PUBLICATIONS

Merriam Webster's Collegiate Dictionary 10th Edition 1998, p. 508, Graplite.*

* cited by examiner

Primary Examiner—P. Hampton-Hightower
(74) Attorney, Agent, or Firm—Knobbe, Martens, Olson & Bear, LLP

(57) ABSTRACT

Disclosed is an antistatic monomer-cast nylon (MC nylon) polymer. The MC nylon polymer includes graphite particles nonuniformly distributed in an MC nylon polymer structure. The graphite particles are partially agglomerated and form a micro-domain phase. The antistatic MC nylon has volume specific resistance of about $10^5$ Ω·cm to about $10^9$ Ω·cm. Also disclosed is a method of producing antistatic MC nylon. A mixture comprising a monomer of the nylon and graphite is prepared and cast in a mold. The mixture is stirred to disperse the graphite and the monomer polymerizes to form an antistatic MC polymer.

26 Claims, 2 Drawing Sheets

ANTISTATIC MONOMER CAST NYLON

BACKGROUND OF THE INVENTION

1. Field of the Invention

The present invention relates to monomer cast nylon and, more particularly, to monomer cast nylon having improvement in the antistatic properties and physical properties and a method of producing thereof.

2. Description of the Related Art

Monomer cast nylon (hereinafter referred to as "MC nylon"), which has a molecular structure belonging to Nylon 6's or Nylon 12's, is quite different from general nylon in that it is prepared through anion polymerization in the presence of a base catalyst in a casting mold. Generally, MC nylon has very high crystallinity, which provides superiority in tensile strength and abrasion resistance to other nylons. With these properties, MC nylon has numerous applications in various fields.

Lacking a function of removing electrostaticity, MC nylon itself is of electrical insulation with a volume specific resistance from $10^{14}$ $\Omega \cdot cm$ to $10^{15}$ $\Omega \cdot cm$. It is virtually impossible to use MC nylon for fly wheels, jigs and pallets, which are required in fabricating or assembling processes of the fine electronic articles, such as printed circuit boards, LCD's and the like.

Metal powder, carbon black and graphite have been suggested to be incorporated in MC nylon to improve electrical conductivity. These conductive materials are added to melt-casting material monomers before polymerization. Metal powder, however, is now found to be unsuitable because it is deposited after casting. Carbon black, when added, exists in a paste form due to its large in specific surface area to adsorb a large quantity of material monomers, which inhibits the polymerization reaction of the monomers. Graphite, which has a smaller specific surface area than the carbon black, is readily dispersed in the monomers without a bad influence on the polymerization.

U.S. Pat. No. 5,179,155 to Sano, et al. discloses that the addition of graphite at amounts of 5 and 10% by weight resulted in volume specific resistance of $5 \times 10^8$ $\Omega \cdot cm$ and $8 \times 10^7$ $\Omega \cdot cm$, respectively. In Sano, et al., however, when incorporating 2.5 wt. % of graphite, the volume specific resistance of the resulting MC nylon is $1 \times 10^{11}$ $\Omega \cdot cm$, which is too high to prevent static electricity. Sano, et al. note that the MC nylon has to incorporate at least 5 wt. % of graphite to have antistatic function. This requirement of at least 5 wt. % of graphite increases the production cost and may deteriorates intrinsic physical properties of MC nylon.

Moreover, Sano, et al. require that the graphite have a surface area of 10 $m^2/g$ or loss in order to prevent the adsorption of the graphite to the monomers. Also the graphite has to be in a particle size of 5–25 $\mu m$ in order to prevent the agglomeration of graphite in the material monomer phase. The requirements for the surface area and the particle size are too limiting and may also increase the production cost.

There exist needs for development of MC nylon having an electrical conductivity level as that of a semiconductor (volume specific resistance of about $10^6$ $\Omega \cdot cm$) while its physical properties are not degraded.

SUMMARY OF THE INVENTION

One aspect of the present invention provides an antistatic monomer-cast nylon (MC nylon) polymer. The MC nylon polymer comprises graphite particles nonuniformly distributed in an MC nylon polymer structure. The graphite particles are partially agglomerated forming a micro-domain phase.

Another aspect of the present invention provides a method of producing antistatic MC nylon. The method comprises: preparing a mixture comprising a monomer of the nylon and graphite; casting the mixture in a mold; stirring the mixture in the mold with a stirrer; and subjecting the mixture to a polymerization reaction at from about 140° C. to about 200° C.

Still another aspect of the present invention provides an antistatic MC nylon polymer. The MC polymer comprises graphite particles in a polymer structure and produced according to the method as above.

BRIEF DESCRIPTION OF THE DRAWINGS

The above aspects of the invention will become apparent from the following description of embodiments with reference to the accompanying drawings in which.

DETAILED DESCRIPTION OF THE PREFERRED EMBODIMENT

As is general, in accordance with the present invention, MC nylon is prepared by polymerizing nylon monomers in the presence of a base catalyst with aid of an initiator. Caprolactam or laurylolactam is available as a nylon monomer although not limited thereto. The polymerization of these monomers can be initiated with diisocyanate, such as hexamethylene diisocyanate or toluene diisocyanate (TDI). An alkali metal or alkaline earth metal can be used as a catalyst.

In a preferred embodiment of the present invention, lactam monomers are mixed with graphite along with a base catalyst and a polymerization initiator. The mixture is cast in a mold, where the polymerization reaction proceeds. Immediately after the casting, the mixture in the mold is stirred to make the graphite nonuniformly dispersed.

The amount of the graphite used is about 1 to about 5 wt. % and preferably about 2 to about 3 wt. %. The average particle size of the graphite available in the present invention is from about 2 to about 25 $\mu m$ with a surface area of 25 $m^2/g$ or less. According to the present invention, the electrical conductivity of MC nylon the same as that of a semiconductor is obtained at a relatively small amount of the graphite. Also, the present invention provides a high degree of freedom in selecting graphite to add.

The mold where the mixture is cast is heated up to and maintained at about 140 to about 200 ° C. to enable the polymerization reaction occurs. Preferably, the temperature of the mold is kept at about 150° C. to about 170° C. The polymerization begins when the mixture is cast in the mold and proceeds as the stirring continues. The stirring is carried out as soon as the mixture is cast in the mold to disperse the graphite in the mixture. The stirring can be performed in any suitable way to enable the dispersion of the graphite in the mixture using a suitable stirrer depending on the shape and size of the mold.

The mixture is stirred with a stirrer at a speed of from about 500 to about 3,000 rpm, preferably from about 1000
} to about 1500 rpm. If the stirring speed is below about 500 rpm, a desirable dispersed state of graphite may not obtained in the resulting MC nylon. On the other hand, a stirring speed higher than about 3,000 rpm may cause the reaction mixture to splash, making it difficult to proceed with the process. The stirring continues for about 10 sec. to about 90 sec., preferably about 15 sec. to about 30 sec. Since the polymerization proceed during the stirring, it may not be possible to stir the mixture for over about 90 sec.

Figure 1:
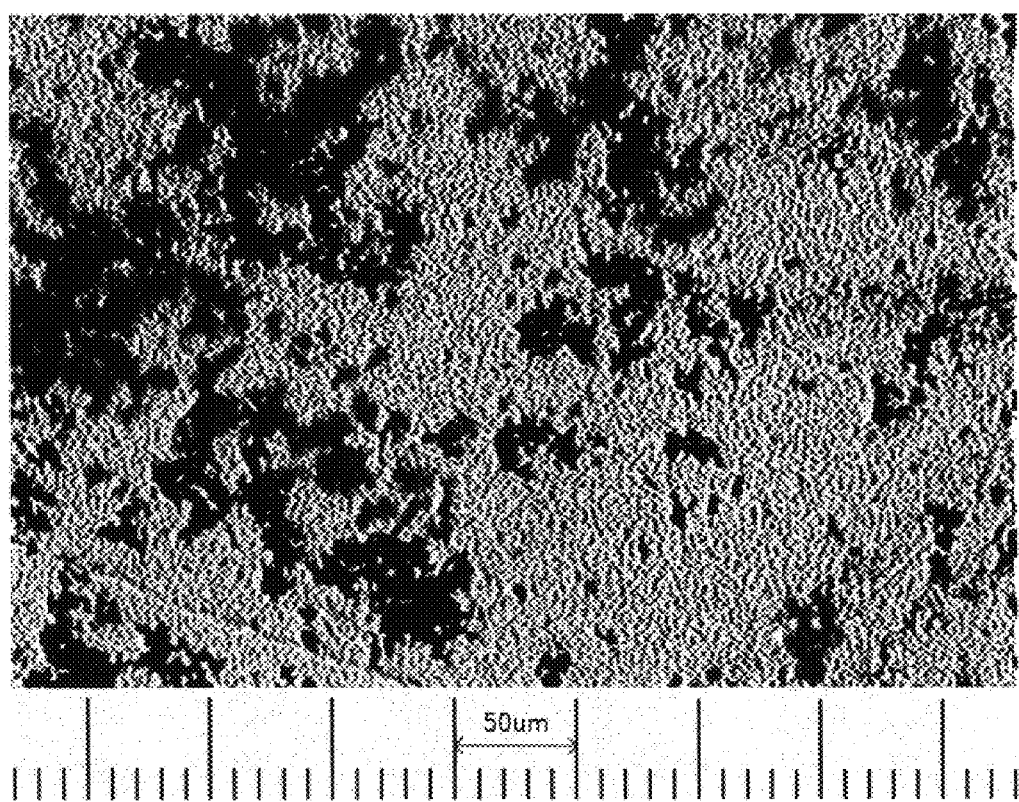
FIG. 1 is a microphotograph of MC nylon polymer prepared as in Example I, magnified by 400 times using an optical microscope.
Figure 2:
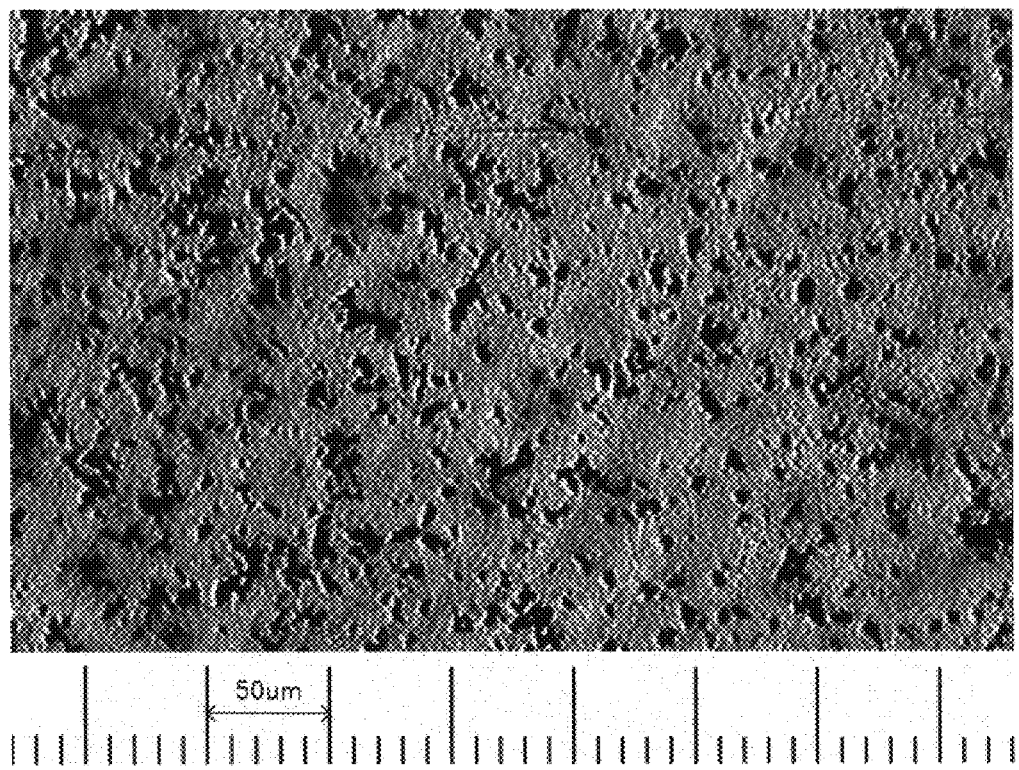
FIG. 2 is a microphotograph of MC nylon polymer prepared as in Comparative Example II, magnified by 400 times through an optical microscope.

The MC nylon according to the present invention has graphite particles nonuniformly dispersed in the MC nylon polymer structure, as shown in FIG. 1. The graphite particles are partially agglomerated to form a micro-domain phase. In contrast, MC nylon prepared without stirring of the mixture has a uniform dispersion of graphite particles within the polymer structure, as shown in FIG. 2.

The volume specific resistance of the MC nylon according to the present invention ranges from about $10^5$ Ω·cm to about $10^9$ Ω·cm, preferably from about $10^6$ Ω·cm to about $10^8$ Ω·cm. This conductivity of the MC nylon of the present invention is attributed to the micro-domain phase of the graphite in the MC nylon polymer structure.

Now, the present invention is described in light of the following Examples, which are set forth to illustrate, but not to limit the claimed invention.

Preparation of MC Nylon Polymers

The graphites used in the following Examples are all available from TIMCAL, a Swiss company. Table 1 below summarizes the properties of the graphites

TABLE 1

| Graphite | Morphology | Average Particle Size ($d_{50}$, μm) | Surface Area (BET · m²/g) |
|---|---|---|---|
| KS 6 | Round | 3.3 | 20 |
| KS 15 | Round | 7.7 | 12 |
| SFG 6 | Needle | 3.2 | 15.2 |

EXAMPLE I

In a 1 liter Erlenmeyer flask were mixed 60 g of toluene diisocyanate and 600 g of ε-caprolactam and stirred at 110° C. Separately, in another Erlenmeyer flask were mixed 600 g of ε-caprolactam and 0.84 g of Na under a dry nitrogen gas stream and maintained at 110° C. The dry nitrogen gas stream was provided to remove water from or avoid addition of water into the flask.

250 g's of each molten solution were mixed with 10 g of "KS 6" graphite preheated at 110° C. A stirrer having a blade of 2 mm high and 5 mm wide and a rotation radius of 10 mm stirred the mixture at 1,500 rpm for 30 sec to make the mixture homogeneous.

The mixture is cast in a Teflon-coated mold maintained at 155° C. Immediately after the casting, the reaction mixture was stirred at 1,500 rpm for 30 sec with an iron rod having a 6 mm×6 mm cross section. After the stirring, polymerization reaction further proceeded for 30 min at 155° C., and MC nylon with a graphite content of 2% by weight was obtained.

EXAMPLE II

Using the graphite KS 15, the same procedure as in Example I was repeated to produce MC nylon containing 2% by weight of graphite KS 15.

EXAMPLE III

Using the graphite SFG 6, the same procedure as in Example I was repeated to produce MC nylon containing 2% by weight of graphite SFG 6.

EXAMPLE IV

The same procedure as in Example I was repeated except that the graphite KS 6 was used at 5% by weight, to produce MC nylon containing 5% by weight of KS 6.

COMPARATIVE EXAMPLE I

MC nylon was obtained in the same manner as that of Example I except that no graphite was added.

COMPARATIVE EXAMPLE II

MC nylon was obtained in the same manner as that of Example I except that the stirring of the mixture in the mold was not conducted after the casting.

COMPARATIVE EXAMPLE III

MC nylon was obtained in the same manner as that of Comparative Example II except that the graphite KS 6 was used at 5% by weight.

Electrical Conductivity of MC Nylon Polymers

Volume specific resistance of the MC nylon polymers obtained in Examples I to IV and Comparative Examples I and II were measured using a four-point probe, "617 Programmable Electrometer" available from KEITHLEY. In order to confirm any differences caused by possible precipitation of the graphite particles, the MC nylon polymers were sliced, and slices from upper, middle and lower portion of the polymers were measured for the volume specific resistance. No significant differences were found among the slices from the different portions of a single polymer from each example. Table 2 lists the values measured from the middle portion of the each of the MC nylon polymers.

TABLE 2

| | Graphite | | Vol Specific |
|---|---|---|---|
| Example No. | Kinds | Amount (wt %) | Resistance (Ω · cm) |
| Example I | KS 6 | 2 | $5 \times 10^6$ |
| Example II | KS 15 | 2 | $3 \times 10^9$ |
| Example III | SFG 6 | 2 | $3 \times 10^6$ |
| Example IV | KS 6 | 5 | $3 \times 10^6$ |
| Comparative Example I | — | — | $>10^{11}$ |
| Comparative Example II | KS 6 | 2 | $>10^{11}$ |
| Comparative Example III | KS 6 | 5 | $8 \times 10^9$ |

The MC nylons of Examples I and III, with only 2 wt. % of KS 6 and SFG 6 graphites, both having an average particle size of about 3 μm, showed volume specific resistance of semiconductors'. Comparative Example I with no graphite and Comparative Example II with the same kind and amount of graphite as Example I indicate very high volume specific resistance like an insulator. The MC nylon of Example II, which used 2 wt. % of KS 15 graphite having a larger average particle size, still showed much lower volume specific resistance than those of the Comparative Examples I and II. Example IV using 5 wt. % of KS 6 graphite also showed much lower volume specific resistance than that of Comparative Example III, which used the same amount and kind of graphite.

In view of the foregoing data and comparison, the stirring of the mixture after the casting in Examples I through IV is appreciated to cause the low volume specific resistance (high conductivity) of the MC nylon polymers.

Physical Properties of MC Nylon

Some representative physical properties of the MC nylon polymers of Examples I to IV and Comparative Examples I and II were measured in accordance with methods disclosed in ASTM (American Society for Testing Materials) D-256 and ASTM D-638. Tensile strength was measured utilizing a universal tester, "LR 50K" available from LLOYD INSTRUMENTS. For impact strength, a notched Izod test was conducted using "43-02" (pendulum: 75 kg·cm) available from TMI Co. This test was repeated at least 10 times and average values were obtained, exclusive of the maximal and minimal values. Table 3 lists the measured values.

TABLE 3

| Example No. | Graphite Kind | Graphite Amount (Wt%) | ASTM D-256 Notched Izod Impact Strength (Kg · cm/- 2.54 cm) | ASTM D-638 Tensile Strength (kg/cm$^2$) | ASTM D-638 Modulus of Elasticity (kg/cm$^2$) | ASTM D-638 Elongation at break (%) |
|---|---|---|---|---|---|---|
| Example I | KS 6 | 2 | 10 | 820 | 36,000 | 10 |
| Example II | KS 15 | 2 | 8 | 840 | 34,000 | 12 |
| Example III | SFG 6 | 2 | 10 | 810 | 35,000 | 11 |
| Example IV | KS 6 | 5 | 5 | 740 | 38,000 | 4 |
| Comparative Example I | — | — | 9 | 880 | 35,000 | 15 |
| Comparative Example II | KS 6 | 2 | 9 | 810 | 37,000 | 10 |
| Comparative Example III | KS 6 | 5 | 4 | 750 | 35,000 | 4 |

As apparent from Table 3, the physical properties of the MC nylon polymers from Examples I to III are not much different from the MC nylon polymers from Comparative Examples I and II, which have much less conductivity than Examples I to III. It is appreciated that the MC nylon polymers from Examples I to III containing 2 wt. % of graphite with stirring after the casting retain intrinsic physical properties of conventional MC nylon polymers.

Besides the high conductivity, the MC nylon polymers of Examples I to III have much superior physical properties to those of the MC nylon of Comparative Example III, having some conductivity. It is advantageous that a smaller amount of graphite is used to reduce the production cost of antistatic MC nylon as well as to minimize degradation of the physical properties of the products made of the nylon.

Dispersed Phase of Graphite in MC Nylon

The dispersed states of graphite in MC nylon were examined with an optical microscope. Specimens of a thickness of 1 mm or less, prepared as in Examples I to IV and Comparative Example II were observed.

Referring to FIG. 1 for MC nylon prepared as in Example 1 is shown, graphite particles are nonuniformly dispersed and partially agglomerated to form micro-domains within the polymer structure. Although not shown, similar observations were made for the specimens of Examples II to IV. Referring to FIG. 2 for MC nylon prepared as in Comparative Example II, however, graphite particles are uniformly dispersed over the polymer structure. It is deduced that the stirring of the mixture after the casting in the mold in Examples I to IV allows the graphite particles nonuniformly dispersed since Comparative Example II resulting in the uniform distribution of the graphite does not have stirring in the mold.

As discussed above with reference to Table 2, the MC nylon polymers of Examples I to IV have higher conductivity than those of Comparative Example II. The high conductivity of Examples I to III is believed owing to the nonuniform graphite distribution and the micro-domain phase caused by the stirring of the mixture after the casting. Moreover, the high conductivity of the MC nylon polymers even with a smaller amount of the graphite than the prior art (at least 5 wt. %) is also believed due to the nonuniform graphite distribution and its micro-domain phase.

The MC nylon polymers according to the present invention provides an excellent antistatic function while retaining other intrinsic physical properties for conventional MC nylon. Also the present invention is advantageously requires a small amount of the graphite to produce antistatic MC nylon polymers.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An antistatic monomer-cast nylon (MC nylon) polymer, comprising graphite particles nonuniformly distributed in an MC nylon polymer structure, wherein the graphite particles are partially agglomerated and form a micro-domain phase.

2. The antistatic MC nylon polymer according to claim 1, wherein the antistatic monomer-cast nylon contains the graphite particles from about 1 wt. % to about 5 wt. %.

3. The antistatic MC nylon polymer according to claim 2, wherein the antistatic monomer-cast nylon contains the graphite particles from about 2 wt. % to about lo 3 wt. %.

4. The antistatic MC nylon polymer according to claim 1, wherein the graphite particles have an average particle size of from about 3 μm to about 25 μm.

5. The antistatic MC nylon polymer according to claim 1, wherein the graphite particles have a surface area of about 25 m$^2$/g or less.

6. The antistatic MC nylon polymer according to claim 1, wherein the MC nylon has volume specific resistance of about 10$^5$ Ω·cm to about 10$^9$ Ω·cm.

7. The antistatic MC nylon polymer according to claim 1, wherein the MC nylon is polymerized from caprolactam or laurylolactam.

8. A method of producing antistatic MC nylon polymer, comprising:

preparing a mixture comprising a monomer of the nylon and graphite;

casting the mixture in a mold;

stirring the mixture in the mold with a stirrer; and subjecting the mixture to a polymerization reaction at a temperature from about 140° C. to about 200° C.

9. The method according to claim 8, wherein the stirring starts immediately after the mixture is cast in the mold.

10. The method according to claim 8, wherein the mold is preheated to the temperature from about 140° C. to about 200° C. to proceed the polymerization reaction when the mixture is cast.

11. The method according to claim 10, wherein the polymerization reaction further proceeds after the stirring.

12. The method according to claim 8, wherein the stirrer stirs the mixture at from about 500 rpm to about 3000 rpm.

13. The method according to claim 8, wherein the stirrer stirs the mixture for from about 10 sec. to about 90 sec.

14. The method according to claim 8, wherein the mixture further comprising at least one of a polymerization initiator and a polymerization catalyst.

15. The method according to claim 8, wherein the mixture contains the graphite particles from about 1 wt. % to about 5 wt. %.

16. The method according to claim 15, wherein the antistatic monomer-cast nylon contains the graphite particles from about 2 wt. % to about 3 wt. %.

17. The method according to claim 8, wherein the graphite particles have an average particle size of from about 3 $\mu$m to about 25 $\mu$m.

18. The method according to claim 8, wherein the graphite particles have a surface area of about 25 $m^2/g$ or less.

19. The method according to claim 8, wherein the monomer is caprolactam or laurylolactam.

20. The method according to claim 14, wherein the catalyst is selected from the group consisting of alkali metals and alkaline earth metals.

21. The method according to claim 14, wherein the polymerization initiator is a diisocyanate compound.

22. An antistatic MC nylon polymer, comprising graphite particles in a polymer structure, wherein the polymer is produced according to the method of claim 8.

23. The antistatic MC nylon polymer according to claim 22, wherein the graphite particles are nonuniformly distributed and partially agglomerated whereby forming a microdomain phase.

24. The antistatic MC nylon polymer according to claim 22, wherein the antistatic MC nylon has volume specific resistance of about $10^5$ $\Omega$·cm to about $10^9$ $\Omega$·cm.

25. The antistatic MC nylon polymer according to claim 24, wherein the MC nylon has volume specific resistance of about $10^6$ $\Omega$·cm to about $10^8$ $\Omega$·cm.

26. The antistatic MC nylon polymer according to claim 1, wherein the polymer is used for making an apparatus for fabricating or assembling fine electronic articles.

* * * * *